(12) United States Patent
Block et al.

(10) Patent No.: US 6,983,324 B1
(45) Date of Patent: Jan. 3, 2006

(54) DYNAMIC MODIFICATION OF CLUSTER COMMUNICATION PARAMETERS IN CLUSTERED COMPUTER SYSTEM

(75) Inventors: Timothy Roy Block, Rochester, MN (US); Kiswanto Thayib, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 863 days.

(21) Appl. No.: 09/694,586

(22) Filed: Oct. 23, 2000

(51) Int. Cl.
*G06F 15/16* (2006.01)

(52) U.S. Cl. ............. 709/228; 709/204; 709/205; 709/221; 709/232; 709/248

(58) Field of Classification Search ......... 709/221, 709/227, 228, 204, 205, 232, 248, 249; 714/4
See application file for complete search history.

(56) References Cited

U.S. PATENT DOCUMENTS

| | | | | |
|---|---|---|---|---|
| 6,047,323 A | * | 4/2000 | Krause | 709/227 |
| 6,108,699 A | * | 8/2000 | Moiin | 709/221 |
| 6,119,163 A | | 9/2000 | Monteiro et al. | |
| 6,192,417 B1 | * | 2/2001 | Block et al. | 709/249 |
| 6,292,905 B1 | * | 9/2001 | Wallach et al. | 714/4 |

* cited by examiner

*Primary Examiner*—Saleh Najjar
*Assistant Examiner*—B R Bruckart
(74) *Attorney, Agent, or Firm*—Wood, Herron & Evans, LLP

(57) ABSTRACT

An apparatus, program product and method support the dynamic modification of cluster communication parameters through a distributed protocol whereby individual nodes locally confirm initiation and status information for every node participating in a parameter modification operation. By doing so, individual nodes are also able to locally determine the need to undo locally-performed parameter modifications should any other node be incapable of performing a parameter modification. Moreover, specifically with respect to cluster communication parameters such as heartbeat parameters, such parameters may be dynamically modified by configuring a sending node to send a heartbeat message to a receiving node, with the heartbeat message indicating that a heartbeat parameter is to be modified. In response to the heartbeat message, the receiving node may then send an acknowledgment message to the sending node that indicates whether the heartbeat parameter has been modified in the receiving node. Further, modification of the heartbeat parameter in the sending node may be deferred until the acknowledgment message from the receiving node indicates that the heartbeat parameter has been modified in the receiving node.

29 Claims, 5 Drawing Sheets

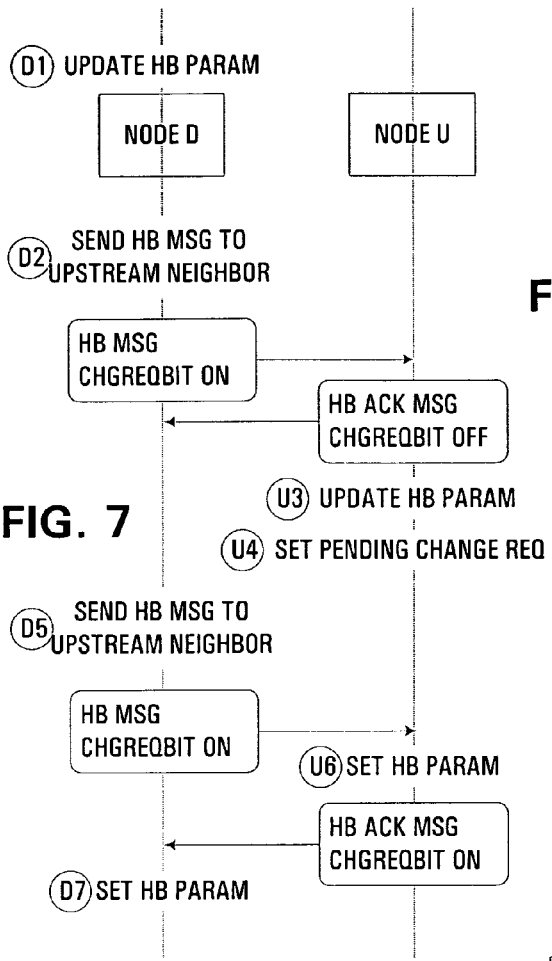
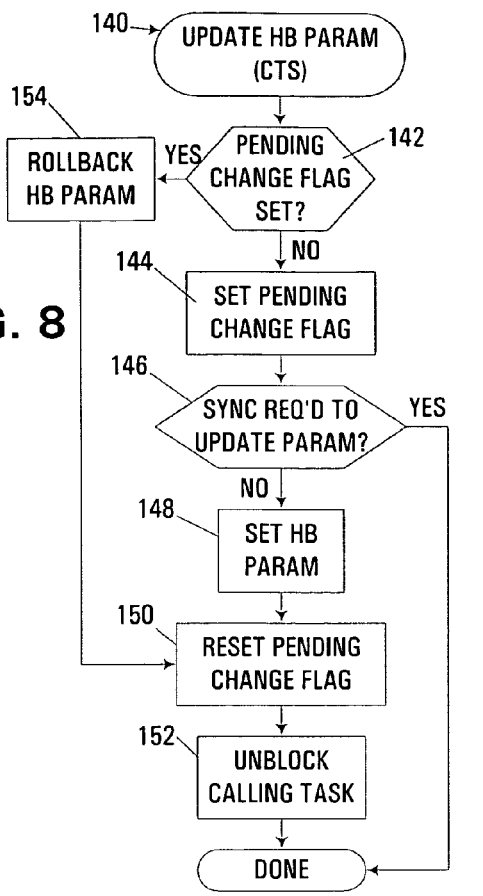
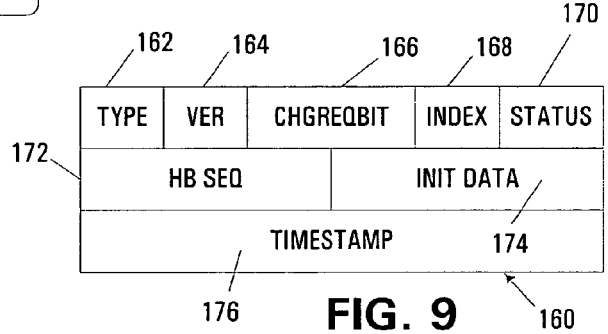
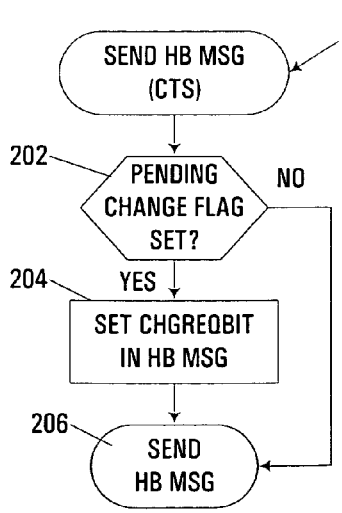
FIG. 7
FIG. 8
FIG. 9
FIG. 10

DYNAMIC MODIFICATION OF CLUSTER COMMUNICATION PARAMETERS IN CLUSTERED COMPUTER SYSTEM

CROSS-REFERENCE TO RELATED APPLICATIONS

This application is related to U.S. patent application Ser. No. 09/694,599, filed on even date herewith by Timothy Roy Block et al., entitled "DYNAMIC MODIFICATION OF FRAMENTATION SIZE CLUSTER COMMUNICATION PARAMETER IN CLUSTERED COMPUTER SYSTE", the disclosure of which is incorporated by reference herein.

FIELD OF THE INVENTION

The invention is generally directed to clustered computer systems, and in particular, to the control of communications between cluster nodes based on configurable communication parameters.

BACKGROUND OF THE INVENTION

"Clustering" generally refers to a computer system organization where multiple computers, or nodes, are networked together to cooperatively perform computer tasks. An important aspect of a computer cluster is that all of the nodes in the cluster present a single system image—that is, from the perspective of a user, the nodes in a cluster appear collectively as a single computer, or entity.

Clustering is often used in relatively large multi-user computer systems where high performance and reliability are of concern. For example, clustering may be used to provide redundancy, or fault tolerance, so that, should any node in a cluster fail, the operations previously performed by that node will be handled by other nodes in the cluster. Clustering is also used to increase overall performance, since multiple nodes can often handle a larger number of tasks in parallel than a single computer otherwise could. Often, load balancing can also be used to ensure that tasks are distributed fairly among nodes to prevent individual nodes from becoming overloaded and therefore maximize overall system performance. One specific application of clustering, for example, is in providing multi-user access to a shared resource such as a database or a storage device, since multiple nodes can handle a comparatively large number of user access requests, and since the shared resource is typically still available to users even upon the failure of any given node in the cluster.

As with most computer systems, clustered computer systems are often configurable so as to maximize performance within a particular application. Moreover, since communication between nodes in a clustered computer system is often a critical path in controlling system performance, many clustered computer systems have a number of configurable low-level communication parameters that control how each node operates in the system.

As an example, many clustered computer systems require some form of "liveliness" communications between nodes to insure that all nodes are operational and in full communication with one another. If a node is no longer reachable, the remaining active nodes are required to perform appropriate recovery actions to compensate for the loss of a failing node.

In many clustered computer systems, liveliness determinations are made through the distribution of "heartbeat" messages between neighbor nodes. Often a node will periodically send a heartbeat message to a neighbor node, and then wait for a reply message from the neighbor node. If a reply message is not received within a particular period of time, the node that sent the heartbeat message may assume that the other node has failed.

Parameters such as the frequency at which heartbeat messages are sent, the time period within which reply messages must be received, and the number of missed reply messages that will trigger a determination of a failed node may have a significant impact on the performance of a clustered computer system, although the precise values of these parameters may be different in different applications. For example, if all nodes in a clustered computer system are connected over a high-speed network such as a Local Area Network (LAN), a relatively short time-out period, e.g., 15 seconds, may be sufficient to balance the reliability and timeliness of failure determinations. However, were an additional node added to such a system and interconnected via a relatively lower-speed network such as a Wide Area Network (WAN), a time-out period of 2 or 3 minutes may be more appropriate.

As another example, many clustered computer systems implement controlled fragmentation of cluster messages, whereby large messages are broken up into multiple, smaller packets, prior to being sent across a network. In some instances, such controlled fragmentation, is performed directly within the clustering environment, typically to add reliability functionality to cluster messaging services. The size of the individual packets is typically controlled by a fragmentation size parameter, and it is often desirable to minimize the number of packets, and thus the transmission overhead associated with the header information transmitted along with such packets, by setting the fragmentation size to be the largest size possible. However, in many clustering environments, the maximum fragmentation size is limited by the fact that the underlying network protocol may also implement fragmentation based upon the limitations of the networking hardware utilized in the cluster. As a result, the optimum fragmentation size in a given clustered computer system may vary depending upon the underlying network hardware for the system.

Conventional clustered computer systems permit low-level communication parameters such as heartbeat parameters and fragmentation sizes to be individually set on different nodes. However, such settings are typically made via configuration files that are read during startup, and thus, these parameters are often not capable of being modified without requiring a node, or an entire clustered computer system, to be taken off line and restarted.

Given the desirability of maximizing availability in clustered computer systems, it would be extremely beneficial to permit such parameters to be modified dynamically, without requiring a node or system to be taken off line. Conventional clustered computer systems, however, lack any such functionality, and thus any modifications made to such systems require at least some interruption of availability.

Moreover, it has been found that many cluster communication parameters utilized by cluster nodes are not capable of simply being modified locally on a node without some degree of coordination with other nodes. As an example, if the time period between heartbeat message transmissions from a sending node is changed to a longer value in the sending node, but the time period that a receiving node expects to receive heartbeat messages is not likewise changed to a greater value before the longer delay is instituted by the sending node, the receiving node may time out and inappropriately detect a failure in the sending node. As another example, modifying the fragmentation size on a sending or source node requires coordination with any receiver or target nodes so that such target nodes process any received messages using the correct fragmentation size.

Therefore, a significant need exists in the art for a manner of reliably modifying cluster communication parameters in a clustered computer system with reduced effect on system availability.

SUMMARY OF THE INVENTION

The invention addresses these and other problems associated with the prior art in providing an apparatus, program product and method that support the dynamic modification of cluster communication parameters through a distributed protocol whereby individual nodes locally confirm initiation and status information for every node participating in a parameter modification operation. By doing so, individual nodes are also able to locally determine the need to undo locally-performed parameter modifications should any other node be incapable of performing a parameter modification. As such, dynamic modifications may be implemented in an efficient yet reliable manner, and often without any significant effect on the availability of any node in a clustered computer system.

Therefore, consistent with one aspect of the invention, a cluster communication parameter in a clustered computer system may be dynamically modified by initiating a cluster communication parameter modification by transmitting a message to a plurality of nodes in the clustered computer system, locally confirming, within each node, receipt of the message by each of the plurality of nodes, in response to confirming receipt of the message by each of the plurality of nodes, invoking a local cluster communication parameter modification operation on each node, transmitting from each node a status of the local cluster communication parameter modification invoked on that node, locally detecting, within each node, an unsuccessful status for the local cluster communication parameter modification of any node, and in response to detecting an unsuccessful status for any node, locally undoing, in each node for which the local cluster communication operation was performed, the local cluster communication parameter modification operation performed on that node.

The invention also addresses additional problems associated with the prior art by providing an apparatus, program product and method in which a heartbeat parameter for a plurality of nodes in a clustered computer system may be dynamically modified. As discussed above, one difficulty that may be present in the modification of a cluster communication parameter such as a heartbeat parameter is the coordination of multiple nodes to ensure that the local modifications made within such nodes do not cause mistaken detections of node failures due to incompatible parameter values in different nodes.

Therefore, consistent with another aspect of the invention, dynamic modification to a heartbeat parameter may be implemented by configuring a first, sending node to send a heartbeat message to a second, receiving node, with the heartbeat message indicating that a heartbeat parameter is to be modified. Then, modification of the heartbeat parameter in the first node may be deferred until receipt of an acknowledgment message sent from the second node to the first node that indicates that the heartbeat parameter has been modified in the second node.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

BRIEF DESCRIPTION OF THE DRAWINGS

FIG. 7 is a sequence diagram illustrating the sequence of operations that occur during dynamic modification of a heartbeat parameter responsive to invocation of a local cluster communication parameter modification operation on each node of the clustered computer system of FIG. 1.

FIG. 8 is a flowchart illustrating the program flow of an update heartbeat parameter routine executed by the cluster topology services component of FIG. 3 on each node in the clustered computer system of FIG. 1.

FIG. 9 is a block diagram of an exemplary heartbeat message data structure utilized by the update heartbeat parameter routine of FIG. 8.

FIG. 10 is a flowchart illustrating the program flow of a send heartbeat message routine executed by the cluster topology services component of FIG. 3 on each node in the clustered computer system of FIG. 1.

DETAILED DESCRIPTION

Figure 1:
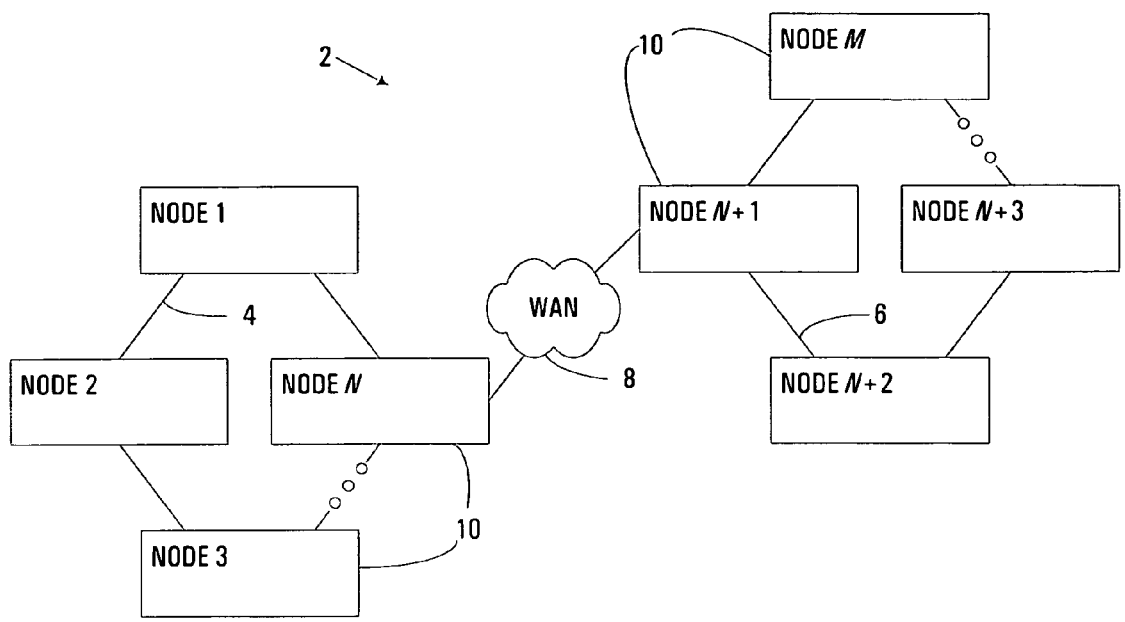
FIG. 1 is a block diagram of a clustered computer system consistent with the invention.

The embodiments described hereinafter utilize a distributed protocol to ensure efficient and reliable modification of cluster communication parameters with little or no effect on system availability. Turning to the Drawings, wherein like numbers denote like parts throughout the several views, FIG. 1 illustrates an exemplary clustered computer system 2 including a plurality of nodes 10 interconnected with one another in a distributed manner, e.g., via local area networks (LAN's) 4, 6 and a wide area network (WAN) 8. Any number of network topologies commonly utilized in clustered computer systems may be used consistent with the invention. Moreover, individual nodes 10 may be physically located in close proximity with other nodes, or may be geographically separated from other nodes, as is well known in the art. By virtue of the flexible nature of the herein-described dynamic cluster communication parameter control, however, it will be appreciated that various communication parameters for the system may be tailored to optimize performance and reliability of the system through optimizing the parameter settings on each node. Thus, a wide variety of interconnection types, network types, node types, etc., may be permitted to coexist with one another in an efficient and reliable manner. Furthermore, should the network topology ever be modified, individual nodes may be modified so as to update cluster communication parameters associated therewith. Of significant importance in this regard is that such modifications can often be made without having to take any node offline, which is an important concern in practically every clustering environment.

Figure 2:
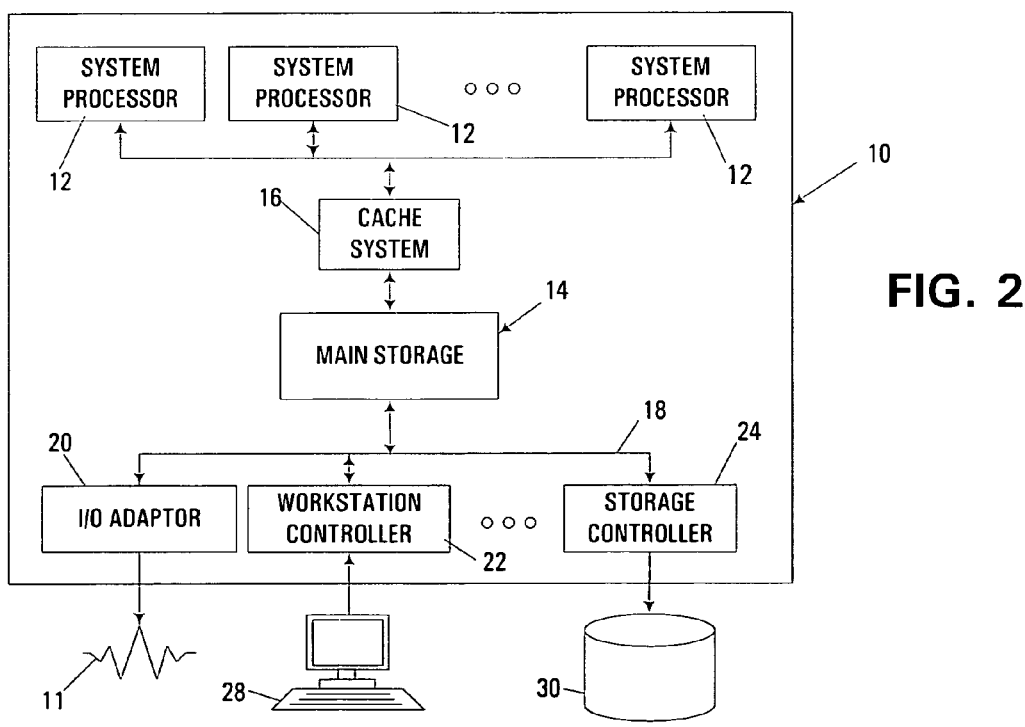
FIG. 2 is a block diagram of a node in the clustered computer system of FIG. 1.

Now turning to FIG. 2, an exemplary hardware configuration for one of the nodes 10 in clustered computer system 2 is shown. Node 10 generically represents, for example, any of a number of multi-user computers such as a network server, a midrange computer, a mainframe computer, etc. However, it should be appreciated that the invention may be implemented in other computers and data processing systems, e.g., in stand-alone or single-user computers such as workstations, desktop computers, portable computers, and the like, or in other programmable electronic devices (e.g., incorporating embedded controllers and the like).

Node 10 generally includes one or more system processors 12 coupled to a main storage 14 through one or more levels of cache memory disposed within a cache system 16. Furthermore, main storage 14 is coupled to a number of types of external devices via a system input/output (I/O) bus 18 and a plurality of interface devices, e.g., an input/output adaptor 20, a workstation controller 22 and a storage controller 24, which respectively provide external access to one or more external networks (e.g., a cluster network 11), one or more workstations 28, and/or one or more storage devices such as a direct access storage device (DASD) 30. Any number of alternate computer architectures may be used in the alternative.

Figure 3:
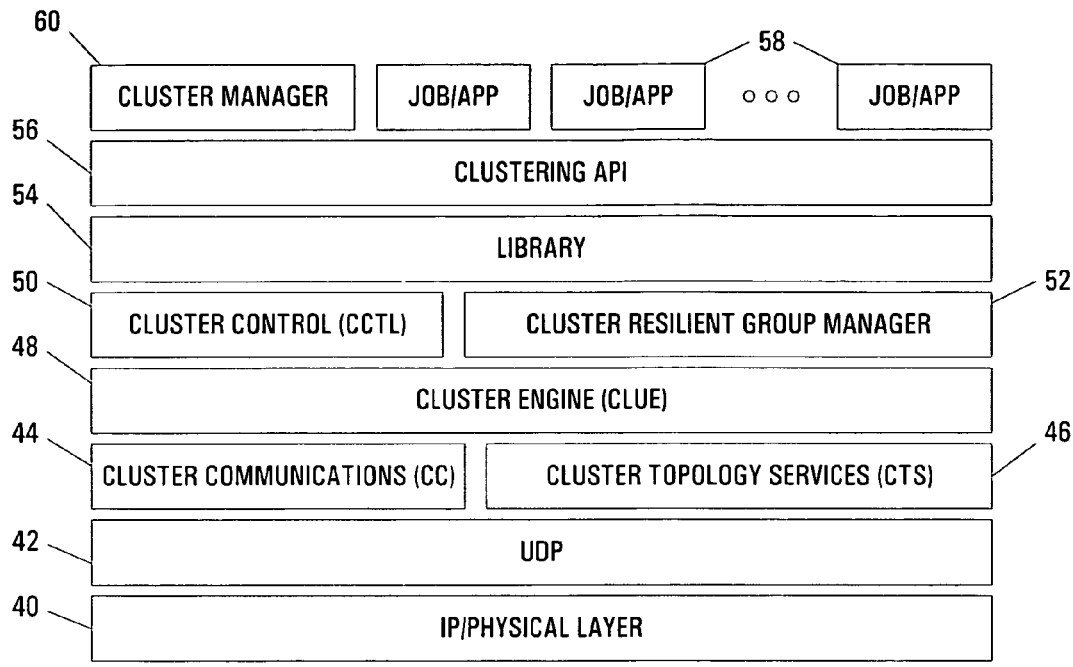
FIG. 3 is a software layer diagram of the principal clustering software components utilized in the node of FIG. 2.

As shown in FIG. 3, the principal software components executed within each node 10 include an 1P/physical layer component 40, a UDP component 42, a cluster communications (CC) component 44, a cluster topology services (CTS) component ~46, a cluster engine (CLUE) component 48, a cluster control (CCTL) component 50, a cluster resilient group manager component 52, a library component 54, a clustering API component 56, and a plurality of jobs/applications 58, including a cluster manager application 60.

Generally, IP/physical layer component 40 provides an industry standard communications stack and physical interface with a network. UDP component 42 provides a packet transmission protocol, and CC component 44 provides support for reliable multicast clustering communication services, e.g., as discussed in greater detail in U.S. patent application Ser. No. 09/280,469, filed by Block et al. on Mar. 30, 1999, the disclosure of which is incorporated by reference herein.

CTS component 46 monitors the network topology of a clustered computer system, and stores information such as the layout of nodes, the specifications of network interconnects between nodes, the geographical locations of nodes, and node status information. CLUE component 48 provides a distributed ordered group messaging service. It is also within CLUE component 44 and CTS component 46 that much of the low level cluster communication parameters and the support routines for dynamically and locally modifying such parameters consistent with the invention is implemented.

CCTL component 50 manages the configuration and activation of clustering on a node, typically supporting various cluster initialization and node management operations suitable for managing a clustered environment. It is also within this layer that coordination of dynamic modifications by multiple nodes via the herein-described distributed parameter modification protocol is provided.

Cluster resilient group manager component 52 synchronously maintains copies of group membership status information across the cluster, while library component 54 provides other support services for a cluster. Clustering API component 56 provides the external interface to the underlying clustering functionality via jobs/applications 58. Among the functionality supported is that of dynamic cluster communication protocol modifications, managed for example by a cluster manager application 60 that provides the user interface whereby a user such as a systems administrator can initiate the modification of cluster communication parameters.

The discussion hereinafter will focus on the specific routines utilized to implement the above-described dynamic cluster communication parameter modification functionality. The routines executed to implement the embodiments of the invention, whether implemented as part of an operating system or a specific application, component, program, object, module or sequence of instructions, will also be referred to herein as "computer programs," or simply "programs." The computer programs typically comprise one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and nonvolatile memory devices, floppy and other removable disks, hard disk drives, optical disks (e.g., CD-ROM' s, DVD's, etc.), among others, and transmission type media such as digital and analog communication links.

It will be appreciated that various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Dynamic Cluster Communication Parameter Modification

Figure 4:
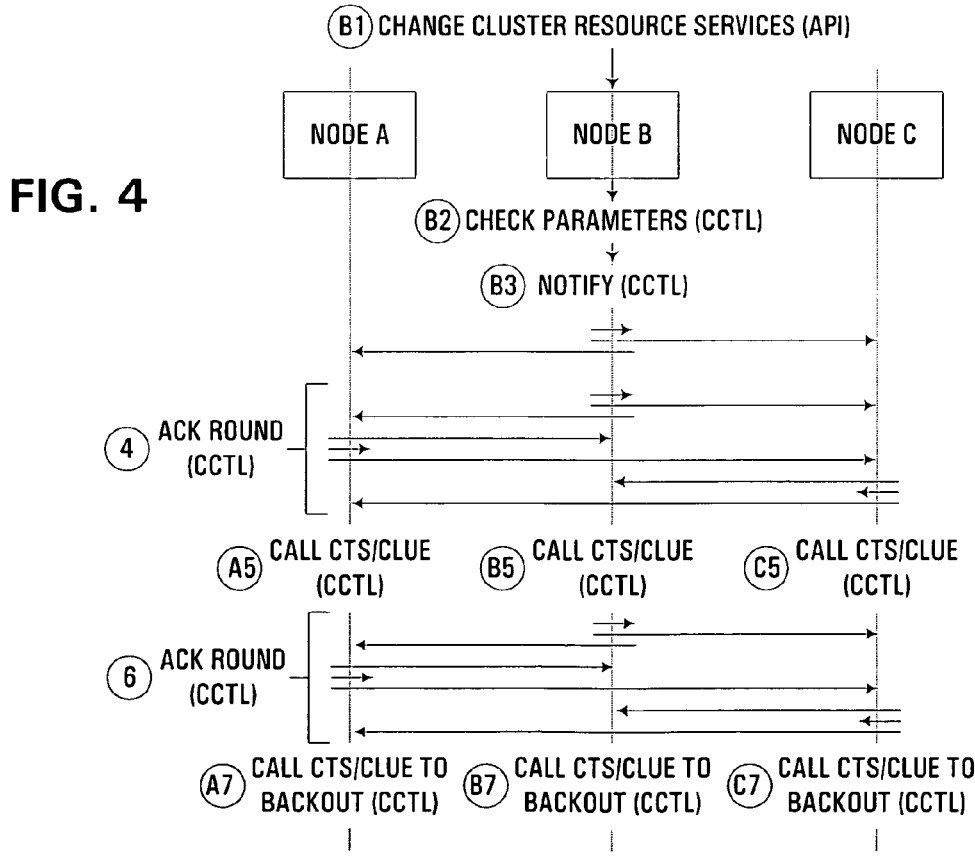
FIG. 4 is a sequence diagram illustrating the sequence of operations that occur during dynamic modification of a cluster communication parameter by the clustered computer system of FIG. 1.

Turning now to FIG. 4, a distributed protocol for effecting dynamic modifications to cluster communication parameters across a plurality of cluster nodes is generally illustrated. With the herein-described distributed protocol, initiation of a parameter modification is handled via the distribution of a message or other form of request to each node affected by a parameter modification. Thereafter, individual nodes are configured to locally track or confirm receipt of an initiating message by all affected nodes, as well as to locally modifying their respective parameters as appropriate and reporting the results, e.g., a successful/unsuccessful status, back to the other affected nodes so that each such node can locally determine the success or failure of the distributed protocol in carrying out a parameter modification request. Furthermore, each affected node is typically configured to automatically undo any local parameter modification in response to detection of a failed protocol resulting from the inability of one or more affected nodes to successfully carry out a parameter modification request.

The term "local", as used herein, generally refers to the scope of a particular node in a clustered computer system, whereby if a particular action occurs locally, that action is typically implemented directly within and on behalf of a particular node. It will also be appreciated by one of ordinary skill in the art that not all nodes in a clustered computer system need necessarily participate in a cluster communication parameter modification. Only those nodes that are affected by a modification, e.g., where a local value for a particular parameter is updated in response to a modification request, or where modifications made to one node are required to be known by another node, need participate in the herein-described distributed protocol.

Moreover, a wide variety of cluster communication parameters may be modified using the herein-described protocol. For example, much of the discussion hereinafter will focus on the modification of heartbeat parameters used to confirm the liveliness of interconnections between nodes in a cluster, e.g., heartbeat message time out, heartbeat acknowledgment message time out, heartbeat frequency or interval, heartbeat failure threshold, heartbeat acknowledgment failure threshold, receive/send timer ratio, etc. Other appropriate communication parameters include, for example, maximum fragment sizes, message retry timer value, maximum message retry time, send queue overflow threshold, message send window size, etc. It will be appreciated that for many parameters local changes may not affect other nodes, and as such, the need for a distributed protocol as discussed herein may not be as great for modifying some types of parameters. It will also be appreciated that practically any conceivable form of cluster communication parameter may be dynamically modified in the general manner discussed herein.

FIG. 4, in particular, illustrates three exemplary Nodes A, B & C for which it is desirable to initiate a dynamic parameter modification consistent with the invention. Assume, for example, that Node B is the node from which a dynamic modification operation is initiated, e.g., via a cluster manager application executing on Node B. As represented by Step B1, initiation of a dynamic modification operation may occur via an API call to the cluster control component of the node to access the change cluster resource services supported via the cluster control component.

At Step B2, the parameter(s) to be modified may be checked for validity and conformance with any range limitations established for the system. Then, in Step B3, every affected node is notified of the request via multicasting of a notify message to all affected nodes.

Subsequent to the multicast, each node participates in an acknowledgment (ACK) round as illustrated at step 4, whereby every node transmits an ACK message to every other node to indicate its receipt of the multicast dynamic parameter modification request.

By virtue of the localized tracking of ACK messages within each node during the ACK round, each node is then capable of confirming that each affected node has in fact received the modification request. Thus, at Steps A5, B5 and C5, each of Nodes A, B & C calls a local, and often lower level (e.g., the CTS and/or CC components of FIG. 3), routine to locally modify each's respective value for the parameter being modified. It will be appreciated that such parameter modifications may occur concurrently with one another in the various nodes. Moreover, as will become more apparent below, additional coordination operations, including distributing messages among components during the local modifications, may also be required should it be necessary to control the order in which the individual nodes modify their respective parameter values.

Upon completion of the local modification routines, each node typically knows the result, or completed status, of its local routine. As a result, in a subsequent ACK round at Step 6, each node may be configured to multicast its result information to every other affected node such that, at the completion of the second ACK round, each node has sufficient information to determine the status of every other affected node. Consequently, based upon the results obtained by each node, Steps A7, B7 and C7 may need to be performed to back out, or "undo," any changes made to particular nodes when the same changes were not successfully made to other nodes in the clustering environment. However, since each node typically receives result, or status, information as a result of the second ACK round, each node is also able to locally determine whether any such undo operations are required without resort to additional communications between nodes.

Figure 5:
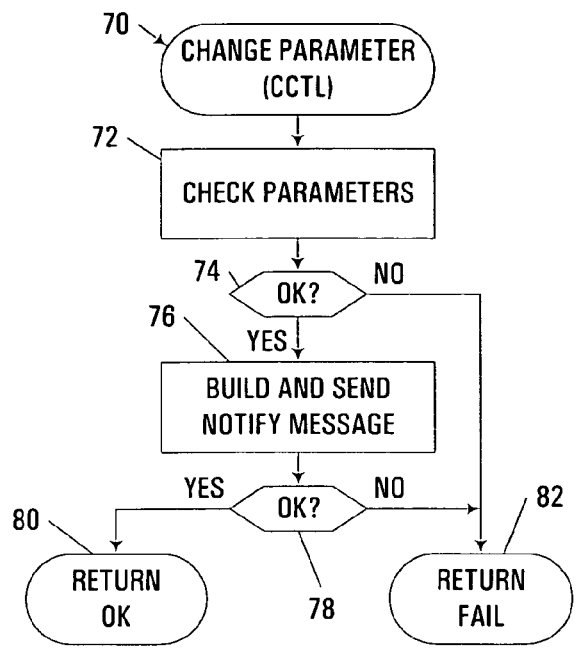
FIG. 5 is a flowchart illustrating the program flow of a change parameter routine executed by the cluster control component of FIG. 3 on an initiator node in the clustered computer system of FIG. 1.
Figure 6:
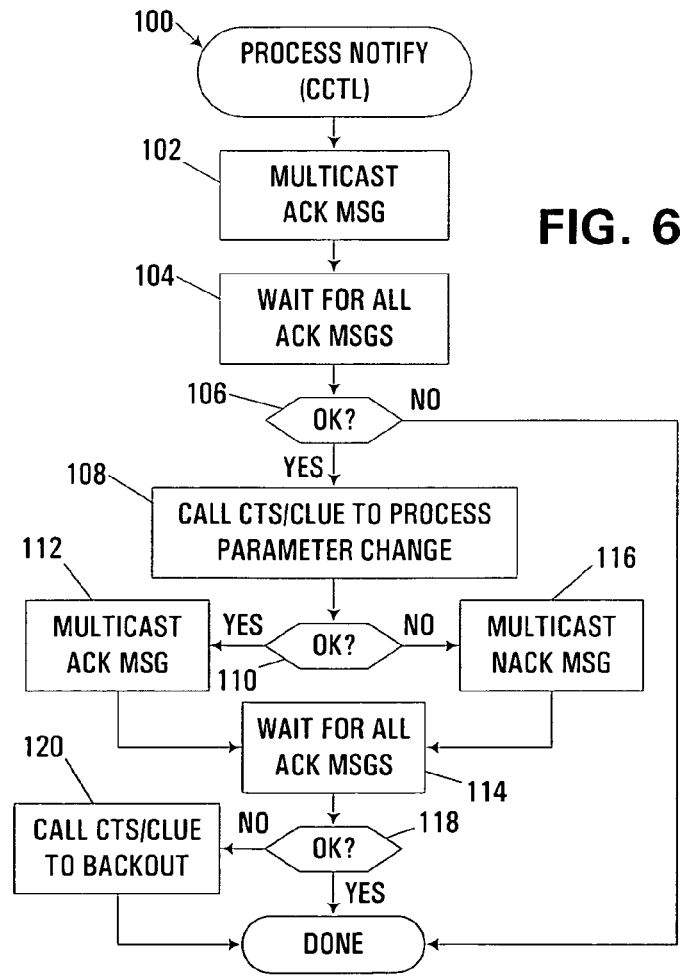
FIG. 6 is a flowchart illustrating the program flow of a process notify routine executed by the cluster control component of FIG. 3 on each node in the clustered computer system of FIG. 1.

FIGS. 5 and 6 next illustrate the initiation and distributed phases of a dynamic communication parameter modification operation consistent with the invention. FIG. 5 in particular illustrates a change parameter routine 70, executed, for example, via an API call made via a job or application. As mentioned above, typically the overall management of dynamic modifications from a cluster level is implemented in the CCTL component of FIG. 3, although the invention should not be limited specifically as such.

Routine 70 begins in block 72 by checking the parameters in the manner discussed above in connection with Step B2 above. Next, block 74 determines whether the check was successful. If so, control passes to block 76 to build and send a "notify" message to all affected nodes (here also including the initiating node) and thereby "kick-off" the protocol. Upon completion of block 76, block 78 determines whether the overall action was successful or not—i.e., whether any node in the cluster failed to process the request. If successful, control passes to block 80 to return an "OK" status and terminate the routine. If not successful, or if the parameter check determined the call to have any errors, control is passed to block 82 to return a "failed" result and terminate the routine.

FIG. 5 next illustrates a process notify routine 100, also executed by the CC component in each node, for use in processing the herein-described distributed protocol. Routine 100 is executed by each affected node receiving an initiation message, typically including the initiating node.

Routine 100 begins in block 102 by multicasting an ACK message to indicate local receipt of the initiation request by the node. Control then passes to block 104 to wait for all ACK messages to be received from all affected nodes. If the ACK round is not successful (e.g., if one or more nodes do not timely respond), routine 100 terminates. Otherwise, control 108 performs a call to a lower level clustering service that performs the local parameter modification on behalf of the node (here the CTS and/or CLUE components).

In the illustrated embodiment, the local parameter modification call is synchronous, and thus the process running routine 100 is held while the local modification is being processed. Upon completion of the local modification, status information is returned to routine 100, and the routine is released.

Block 110 then determines whether the call was successful or not, e.g., via conventional return of status information by the lower level routine. If so, control passes to block 112 to multicast an ACK message, and then to block 114 to wait for all other ACK messages to be received. If not, control passes from block 110 to block 116 to multicast a no acknowledgment (NACK) message indicating that the request failed on that node, and then to block 114 to wait for messages from any remaining active nodes in the system.

Next, block 114 passes control to block 118 to determine whether the ACK round was successful, i.e., whether an ACK message was received from every affected node indicating that the node was able to successfully modify the parameter. If so, routine 100 is complete. If, on the other hand, the ACK round indicated a failure (e.g., in response to receipt of a NACK message, or the time out of one or more nodes without sending any ACK message in a predetermined time period), control passes to block 120 to call the appropriate low level routine to essentially "undo" the local modification made on the node. Thus, by virtue of the localized determination of node status within each interconnected node, it can be ensured without substantial synchronization among nodes that a requested modification will be processed on all affected nodes.

Undoing an operation may be performed in a number of manners consistent with the invention. For example, previous parameter values may be maintained so that a second modification operation could be performed to replace the new values with the previous values. In the alternative, modifications may be effected through a two-step process, whereby modifications are first made temporarily and then permanent.

Other modifications will become apparent to one of ordinary skill in the art.

Dynamic Heartbeat Parameter Modification

As discussed above, one example of a local cluster communication parameter modification operation for the herein-described dynamic modification functionality is that of a heartbeat parameter modification operation. A heartbeat parameter in this context may include various parameters including but not limited to time out thresholds for receiving heartbeat messages and/or heartbeat acknowledgment (ACK) messages, the number of missed messages and/or ACK messages required to trigger a failure detection, the frequency (interval) of heartbeat messages, the number of new messages required to recognize that a node is alive, the ratio of send messages to receive messages, the precision of the heartbeat interval, and other parameters as is well known in the art. It will be appreciated that the herein-described protocol may be capable of modifying parameters that are purely local in nature (i.e., do not require any synchronization between nodes), as well as those that are global in nature (i.e., require some degree of synchronization), as will become more apparent from the discussion below.

As discussed above, the modification of global-type heartbeat parameters presents a potential concern insofar as some degree of coordination or synchronization may be required to ensure that inadvertent failure detections, or inadvertent non-failure detections, do not occur as a result of a local modification on one node that has not yet been handled on another node. Given the asynchronous nature of the various nodes in a cluster, some degree of coordination is require to ensure that local modification operations on each node are performed in a proper order, if the order of such operations can vary the coordinated operation of the cluster.

For example, the specific parameter used by way of example in the discussion hereinafter is the heartbeat interval at which heartbeat messages are sent between a sending node to a receiving node. Consider a sending node that is configured to send a heartbeat message every 3 seconds, and a receiving node that expects the heartbeat message based on this interval, and that declares the sending node failed if a message is not received in that interval. Should no coordination exist between the sending and receiving nodes, changing the interval to a longer value, e.g., 6 seconds, could cause the receiving node to declare the sending node failed if the interval value in the sending node was modified, the sending node started operating at the longer interval, before the value was modified on the receiving node. Such potential problems also exist with a number of other heartbeat parameters, in particular the ratio of send heartbeat messages to receive heartbeat messages.

To address these concerns, the illustrated embodiments perform local operations in a coordinated fashion based on synchronization information passed within the heartbeat messages and heartbeat ACK messages sent between the nodes. FIGS. 7–10 illustrate in greater detail the sequence of operations that occur in effecting a local modification operation for modifying heartbeat parameters in this fashion. It is assumed for the purposes of this embodiment that a "take-care-of-your-neighbor" heartbeat scheme is utilized, whereby heartbeat messages and ACK are exchanged between nearest neighbor pairs in the clustered computer system. Nodes are required to send heartbeat messages to their upstream neighbors, and return heartbeat acknowledgment messages to their downstream neighbors. Typically, a node will have a single upstream and a single downstream neighbor at the most, although in some embodiments, a node may have multiple nodes considered to be immediately upstream therefrom (e.g., where a particular node participates in more than one heartbeat ring). It should also be appreciated that the terms "upstream" and "downstream" are used merely for convenience, and should not be considered to limit the scope of the claims. Also, the invention may also apply to other heartbeat protocols known in the art.

In particular, FIG. 7 illustrates the interaction between a sending (downstream) Node D and a receiving (upstream) Node U in coordinating the local modification of a heartbeat parameter in each node. Synchronization is enabled in the illustrated embodiment through the controlled deferral of a local parameter modification in a sending (or downstream) node until receiving confirmation, via an indication within a heartbeat acknowledgment message, of the completion of the local parameter modification in a receiving (or upstream) node.

Thus, as shown in FIG. 7, at Step D1, Node D receives an update heartbeat parameter request (e.g., corresponding to the call from the CCTL to the CTS at block 108 of FIG. 6). Next, at Step D2, Node D sends at the appropriate interval a heartbeat message. In the illustrated embodiment, the indication used to coordinate the activities of the sending and receiving nodes is via a change request indicator (CHGREQBIT) embedded within each of the heartbeat and heartbeat acknowledgment messages passed between the nodes. In a heartbeat message, the indicator is set to indicate that a change is currently being processed by the sending node. Likewise, the indicator is set in a heartbeat acknowledgment message to indicate that the receiving node has finished processing the change, and that it is permissible for the sending node to proceed on its own local change.

Therefore, assuming first that the update heartbeat parameter request has not yet been received by Node U, the indicator in the heartbeat ACK message returned by Node U to Node D will not be set, and as such, performance of the local modification on Node D will be deferred.

Assuming then that at a later time (which may be prior to a next heartbeat cycle or after any number of heartbeat cycles), Node U does finally receive the upbeat heartbeat parameter request (Step U3), as a component of processing the request, the receive logic in Node U will set a pending change request flag at Step U4. Thereafter, as illustrated by Step D5, when a next heartbeat message is sent by Node D (with the indicator still set), Node U will set its local value for the heartbeat parameter and return a heartbeat ACK message with the indicator set to indicate that the local modification has been completed on Node U (Step U6). Thereafter, upon receipt of the heartbeat ACK message, Node D will recognize that the local modification on Node U is complete, and thus the modification may be made on Node D (Step U7). As such, both Node D and Node U are updated in a reliable and coordinated fashion.

FIG. 8 next illustrates from the perspective of a sending node an update heartbeat parameter routine 140 (e.g., as might be called by block 108 of FIG. 6 to effect a heartbeat parameter modification).

Routine 140 begins in block 142 by determining whether a pending change flag is set, indicating that a heartbeat parameter change is already in progress. If not, control passes to block 144 to set the pending change flag. Next, block 146 determines whether synchronization is required to update the parameter at issue. As discussed above, certain parameters may be local and not require coordination with other nodes, while others may be global and require such coordination. Moreover, even for some global parameters, certain changes may not require synchronization, whereby coordinated modification as disclosed herein may not be required. It is therefore envisioned that block 146 may be configured to make either or both of these determinations.

As an example of a global parameter that may not always require synchronization, for the aforementioned global-type heartbeat interval parameter, changing the interval to a longer time period often requires synchronization since a receiving node that has not already been updated may declare a sending node failed if heartbeat messages are sent at the longer interval, and that longer interval exceeds the threshold where the receiving node declares the sending node as failed. On the other hand, changing the interval to a shorter time period typically does not require synchronization—a receiving node will simply receive heartbeat messages at a greater rate that is still below the threshold that would trigger a failure declaration.

Returning to block 146, assuming first that synchronization is not required, control passes to block 148 to set the local value of the heartbeat parameter for the node. Control then passes to block 150 to reset the pending change flag to indicate completion of the change operation. Next, block 152 unblocks the task that called routine 140. Routine 140 is then complete.

Returning again to block 146, if it is determined that synchronization is required routine 140 is complete, although it should be appreciated that the task that called the routine is still blocked (see block 108 of FIG. 6). As will become more apparent below, this release occurs upon receipt of a heartbeat acknowledgment message that confirms completion of the modification on the receiving node.

Returning now to block 142, if the pending change flag is already set, it is assumed that a previous pending change has been interrupted, and that it is desirable to rollback the heartbeat parameter to its previous state. As such, control passes to block 154 to rollback the heartbeat parameter and thereby undo the modification. Control then passes to blocks 150 and 152 to reset the pending change flag and unblock the calling task. Routine 140 is then complete.

FIG. 9 illustrates one exemplary data structure 160 for a heartbeat message record used for both heartbeat messages and heartbeat acknowledgment messages. Data structure 160 may include information such as a type field 162 that distinguishes a heartbeat message from an acknowledgment message, a version field 164 that identifies a software level or version, a field 166 for the CHGREQBIT indicator, an index field 168 to support multiple paths between nodes, a status field 170 to provide node status information, a heartbeat sequence field 172 to provide heartbeat sequence information, an initialization data field 174 to store initialization data, and a timestamp field 176 to store a timestamp for the message. Other formats and information may be utilized within a heartbeat message and/or a heartbeat acknowledgment message consistent with the invention.

FIG. 10 next illustrates a send heartbeat message routine 200 that is called periodically based on a heartbeat interval parameter. Routine 200 begins in block 202 by determining whether the pending change flag is set. If so, control passes to block 204 to set the CHGREQBIT indicator in the heartbeat message, and then to block 206 to send the heartbeat message with the indicator in a set state. If, on the other hand, the pending change flag is not set, block 202 bypasses block 204 and passes control directly to block 206 to send the heartbeat message without a set indicator. Thus, the current state of the pending change flag controls whether the indicator is set for each heartbeat message.

Figure 11:
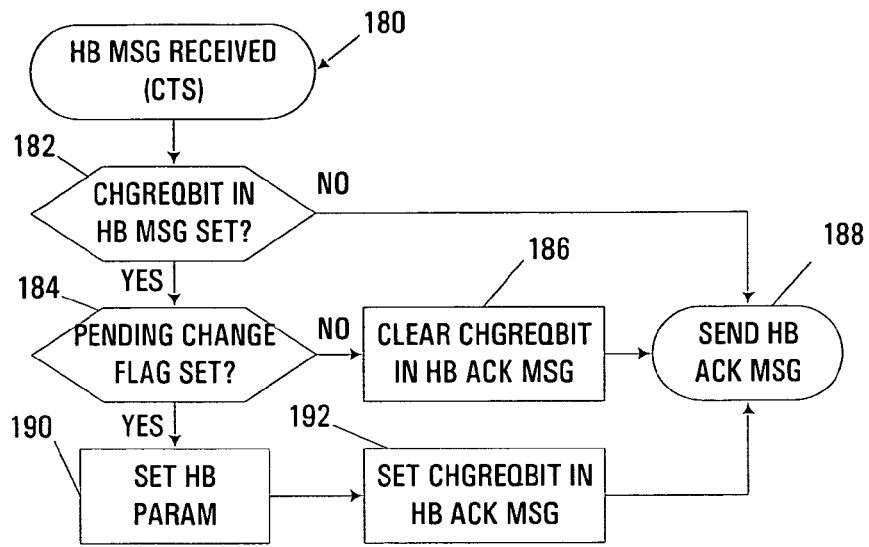
FIG. 11 is a flowchart illustrating the program flow of a heartbeat message received routine executed by the cluster topology services component of FIG. 3 on each node in the clustered computer system of FIG. 1.

FIG. 11 next illustrates from the perspective of a receiving node a heartbeat message received routine 180 (e.g., as might be called in response to receipt of a heartbeat message by a receiving node). Routine 180 begins in block 182 by first determining whether the CHGREQBIT indicator in the heartbeat message is set, indicating that the sending node is in the process of handling a parameter modification. If so, control passes to block 184 to determine whether the pending change flag has been set on the node (e.g., indicating that update heartbeat parameter routine 140 has been called on the receiving node).

If the flag is not set (indicating that the request has not yet been received), control passes to block 186 to clear the CHGREQBIT indicator in the heartbeat message record for the receiving node. Block 188 then sends the heartbeat acknowledgment message to the downstream node with the indicator cleared to indicate that this node has not yet made the local modification. Routine 180 is then complete.

Returning to block 184, if the pending change flag is set, control passes to block 190 to set the local value of the heartbeat parameter. Control then passes to block 192 to set the CHGREQBIT indicator in the heartbeat message record for the receiving node. Block 188 then sends the heartbeat acknowledgment message to the downstream node with the indicator set to indicate that this node has made the local modification. Routine 180 is then complete.

Also, returning to block 182, if the CHGREQBIT indicator in the received heartbeat message is not set, control passes directly to block 188 to send the heartbeat acknowledgment message in a conventional manner. Routine 180 is then complete.

Figure 12:
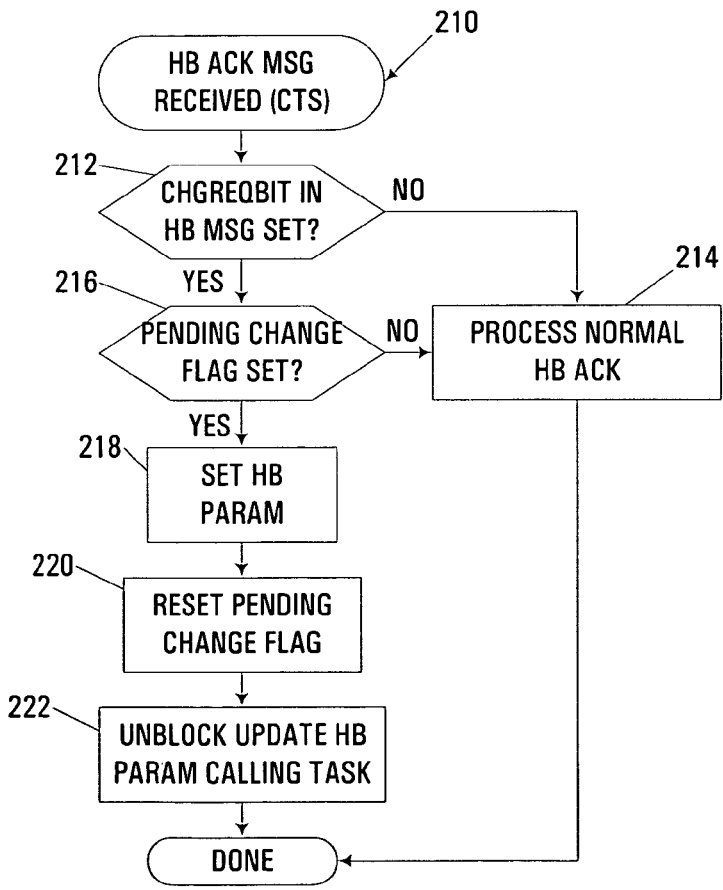
FIG. 12 is a flowchart illustrating the program flow of a heartbeat acknowledgment message received routine executed by the cluster topology services component of FIG. 3 on each node in the clustered computer system of FIG. 1.

FIG. 12 next illustrates again from the perspective of the sending node a heartbeat acknowledgment message received routine 210, which is called in response to receipt of a heartbeat acknowledgment message. Routine 210 begins in block 212 by determining whether the CHGREQBIT indicator is still set in the acknowledgment message. If not, the local modification has not yet been processed by the receiving node, and control therefore passes to block 214 to process the heartbeat acknowledgment message in a conventional manner.

Once a heartbeat acknowledgment message with a set indicator is received, however, the local operation on the receiving node is complete, so block 212 can pass control to block 216 to determine whether the pending change flag is set on the local node. If not (indicating that the local node is not currently processing a local modification operation), control passes to block 214 to process the heartbeat acknowledgment message in a conventional manner. If the flag is set, however, control passes to block 218 to set the local value of the heartbeat parameter for the node. Block 220 then resets the pending change flag to indicate the local operation is complete, and block 222 unblocks the task that called the update heartbeat parameter routine, and routine 210 is complete.

Therefore, it may be seen that through the coordinated fashion in which heartbeat parameters are modified, modifications may be distributed among nodes in a distributed manner, yet without risk of incoherent results among different nodes. As a consequence, the reliability issues that are of predominant importance in clustering environments are satisfied.

Various modifications will be apparent to one of ordinary skill in the art. Therefore, the invention lies in the claims hereinafter appended.

What is claimed is:

1. A method of dynamically modifying a cluster communication parameter in a clustered computer system, the method comprising:
   (a) initiating a cluster communication parameter modification by transmitting a message to a plurality of nodes in the clustered computer system;
   (b) locally confirming, within each node, receipt of the message by each of the plurality of nodes;
   (c) in response to confirming receipt of the message by each of the plurality of nodes, invoking a local cluster communication parameter modification operation on each node;
   (d) transmitting from each node a status of the local cluster communication parameter modification invoked on that node;
   (e) locally detecting, within each node, an unsuccessful status for the local cluster communication parameter modification on any node; and
   (f) in response to detecting an unsuccessful status for any node, locally undoing, in each node for which the local cluster communication operation was performed, the local cluster communication parameter modification operation performed on that node;
wherein the cluster communication parameter is selected from the group consisting of heartbeat message time out, heartbeat acknowledgment message time out, heartbeat frequency or interval, heartbeat failure threshold, heartbeat acknowledgment failure threshold, receive/send timer ratio, maximum fragment size, message retry timer value, maximum message retry time, send queue overflow threshold, message send window size, and combinations thereof.

2. The method of claim 1, wherein the cluster communication parameter comprises a heartbeat parameter.

3. The method of claim 1, wherein locally confirming receipt of the message by each of the plurality of nodes includes participating in an ACK round responsive to receipt of the message.

4. The method of claim 1, wherein transmitting from each node a status of the local cluster communication parameter modification invoked on that node is performed during an ACK round performed subsequent to invoking the local cluster communication parameter modification operation.

5. The method of claim 1, wherein transmitting the message, confirming receipt of the message, and transmitting the status are performed via multicast messages.

6. An apparatus, comprising:
   (a) a memory; and
   (b) a program resident in the memory, the program configured to dynamically modify a cluster communication parameter on a local node among a plurality of nodes in a clustered computer system, the program configured to locally confirm, for the local node, successful receipt of an initiation message by each of the plurality of nodes, and a status for a local cluster communication parameter modification operation performed by each of the plurality of nodes, the program further configured to undo a local cluster communication parameter modification operation performed on the local node in response to detection of an unsuccessful status for a local cluster communication parameter modification on any node;
wherein the cluster communication parameter is selected from the group consisting of heartbeat message time out, heartbeat acknowledgment message time out, heartbeat frequency or interval, heartbeat failure threshold, heartbeat acknowledgment failure threshold, receive/send timer ratio, maximum fragment size, message retry timer value, maximum message retry time, send queue overflow threshold, message send window size, and combinations thereof.

7. The apparatus of claim 6, wherein the program is further configured to locally confirm receipt of an initiating message by each of the plurality of nodes.

8. The apparatus of claim 7, wherein the program is configured to locally confirm receipt of the initiating message by each of the plurality of nodes by participating in an ACK round responsive to receipt of the message.

9. The apparatus of claim 6, wherein the program is further configured to transmit from the local node a status of the local cluster communication parameter modification operation.

10. The apparatus of claim 9, wherein the program is configured to transmit the status during an ACK round performed subsequent to invocation of the local cluster communication parameter modification operation.

11. A clustered computer system, comprising:
   (a) a plurality of nodes coupled to one another over a network; and
   (b) a plurality of programs, each local to a node among the plurality of nodes, each program configured to dynamically modify a cluster communication parameter on its respective local node, each program further configured to locally confirm, for its respective local node, successful receipt of an initiation message by each of the plurality of nodes, and a status for a local cluster communication parameter modification operation performed by each of the plurality of nodes, and each program further configured to undo a local cluster communication parameter modification operation performed on its respective local node in response to detection of an unsuccessful status for a local cluster communication parameter modification on any node;

wherein the cluster communication parameter is selected from the group consisting of heartbeat message time out, heartbeat acknowledgment message time out, heartbeat frequency or interval, heartbeat failure threshold, heartbeat acknowledgment failure threshold, receive/send timer ratio, maximum fragment size, message retry timer value, maximum message retry time, send queue overflow threshold, message send window size, and combinations thereof.

12. A program product, comprising:
(a) a program configured to dynamically modify a cluster communication parameter on a local node among a plurality of nodes in a clustered computer system, the program configured to locally confirm, for the local node, successful receipt of an initiation message by each of the plurality of nodes, and a status for a local cluster communication parameter modification operation performed by each of the plurality of nodes, the program further configured to undo a local cluster communication parameter modification operation performed on the local node in response to detection of an unsuccessful status for a local cluster communication parameter modification on any node; and
(b) a tangible computer readable medium bearing the program;

wherein the cluster communication parameter is selected from the group consisting of heartbeat message time out, heartbeat acknowledgment message time out, heartbeat frequency or interval, heartbeat failure threshold, heartbeat acknowledgment failure threshold, receive/send timer ratio, maximum fragment size, message retry timer value, maximum message retry time, send queue overflow threshold, message send window size, and combinations thereof.

13. The program product of claim 12, wherein the program is further configured to locally confirm receipt of an initiating message by each of the plurality of nodes.

14. The program product of claim 13, wherein the program is configured to locally confirm receipt of the initiating message by each of the plurality of nodes by participating in an ACK round responsive to receipt of the message.

15. The program product of claim 12, wherein the program is further configured to transmit from the local node a status of the local cluster communication parameter modification operation.

16. The program product of claim 15, wherein the program is configured to transmit the status during an ACK round performed subsequent to invocation of the local cluster communication parameter modification operation.

17. A method of dynamically modifying a heartbeat parameter in a node among a plurality of nodes in a clustered computer system, the plurality of nodes including first and second nodes, the first node configured to send a heartbeat message to the second node, and the second node configured to send an acknowledgment message to the first node in response to receiving the heartbeat message, the method comprising:
(a) sending a heartbeat message from the first node to the second node, the heartbeat message indicating that a heartbeat parameter is to be modified; and
(b) deferring modification of the heartbeat parameter in the first node until receipt of an acknowledgment message sent from the second node to the first node that indicates that the heartbeat parameter has been modified in the second node;

wherein the heartbeat parameter is selected from the group consisting of heartbeat message time out, heartbeat acknowledgment message time out, heartbeat frequency or interval, heartbeat failure threshold, heartbeat acknowledgment failure threshold, receive/send timer ratio, and combinations thereof.

18. The method of claim 17, further comprising determining whether modifying the heartbeat parameter on the first node requires synchronization with the second node.

19. The method of claim 18, wherein determining whether modifying the heartbeat parameter on the first node requires synchronization with the second node further comprises determining whether the heartbeat parameter is local or global in nature.

20. The method of claim 17, further comprising, in response to receiving the heartbeat message with the second node, sending an acknowledgment message from the second node to the first node, the acknowledgment message indicating whether the heartbeat parameter has been modified in the second node.

21. The method of claim 20, wherein each of sending the heartbeat message and sending the heartbeat acknowledgment message includes accessing a heartbeat message record that includes a change request indicator, the method further comprising:
(a) prior to sending the heartbeat message that indicates that the heartbeat parameter is to be modified, setting the change request indicator in the heartbeat message record; and
(b) prior to sending the heartbeat acknowledgment message that indicates whether the heartbeat parameter has been modified in the second node, selectively setting or clearing the change request indicator in the heartbeat message record.

22. The method of claim 21, wherein deferring modification of the heartbeat parameter in the first node until the acknowledgment message indicates that the heartbeat parameter has been modified in the second node includes modifying the heartbeat parameter in the first node only after receiving a heartbeat acknowledgment message with a set change request indicator.

23. The method of claim 17, further comprising:
(a) modifying the heartbeat parameter in the second node; and
(b) modifying the heartbeat parameter in the first node after receipt of an acknowledgment message sent from the second node to the first node that indicates that the heartbeat parameter has been modified in the second node.

24. An apparatus, comprising:
(a) a memory; and
(b) a program resident in the memory and configured to dynamically modify a heartbeat parameter in a first node among a plurality of nodes in a clustered computer system by sending a heartbeat message to a second node among the plurality of nodes that indicates that the heartbeat parameter is to be modified and thereafter deferring modification of the heartbeat parameter in the first node only after receiving an acknowledgment message from the second node indicating that the heartbeat parameter has been modified in the second node;

wherein the heartbeat parameter is selected from the group consisting of heartbeat message time out, heartbeat acknowledgment message time out, heartbeat frequency or interval, heartbeat failure threshold, heartbeat acknowledgment failure threshold, receive/send timer ratio, and combinations thereof.

25. The apparatus of claim 24, wherein the program is further configured to determine whether modifying the heartbeat parameter on the first node requires synchronization with the second node.

26. The apparatus of claim 25, wherein the program is configured to determine whether modifying the heartbeat parameter on the first node requires synchronization with the second node by determining whether the heartbeat parameter is local or global in nature.

27. The apparatus of claim 24, wherein the program is configured to send the heartbeat message by accessing a heartbeat message record that includes a change request indicator, and wherein the program is further configured to set the change request indicator in the heartbeat message record prior to sending the heartbeat message that indicates that the heartbeat parameter is to be modified.

28. The apparatus of claim 27, wherein the program is configured to defer modification of the heartbeat parameter in the first node until the acknowledgment message indicates that the heartbeat parameter has been modified in the second node by modifying the heartbeat parameter in the first node only after receiving a heartbeat acknowledgment message with a set change request indicator.

29. A program product, comprising:
 (a) a program configured to dynamically modify a heartbeat parameter in a first node among a plurality of nodes in a clustered computer system by sending a heartbeat message to a second node among the plurality of nodes that indicates that the heartbeat parameter is to be modified and thereafter deferring modification of the heartbeat parameter in the first node only after receiving an acknowledgment message from the second node indicating that the heartbeat parameter has been modified in the second node; and
 (b) a tangible computer readable medium bearing the program;
wherein the heartbeat parameter is selected from the group consisting of heartbeat message time out, heartbeat acknowledgment message time out, heartbeat frequency or interval, heartbeat failure threshold, heartbeat acknowledgment failure threshold, receive/send timer ratio, and combinations thereof.

* * * * *